United States Patent
Bouras et al.

(10) Patent No.: US 12,454,711 B2
(45) Date of Patent: *Oct. 28, 2025

(54) PROCESS FOR TREATING LIGNOCELLULOSIC BIOMASS

(71) Applicants: INSTITUT NATIONAL DE LA RECHERCHE POUR L'AGRICULTURE, L'ALIMENTATION ET L'ENVIRONNEMENT, Paris (FR); IFP Energies Nouvelles, Rueil-Malmaison (FR); Agro Industries Recherche Et Developpement, Pomacle (FR)

(72) Inventors: Meriem Bouras, Rueil-Malmaison (FR); Caroline Aymard, Rueil-Malmaison (FR); Mathieu Aragones, Rueil-Malmaison (FR)

(73) Assignees: INSTITUT NATIONAL DE LA RECHERCHE POUR L'AGRICULTURE, L'ALIMENTATION ET L'ENVIRONNEMENT, Paris (FR); IFP Energies Nouvelles, Rueil-Malmaison (FR); Agro Industries Recherche Et Developpement, Pomacle (FR)

( * ) Notice: Subject to any disclaimer, the term of this patent is extended or adjusted under 35 U.S.C. 154(b) by 737 days.

This patent is subject to a terminal disclaimer.

(21) Appl. No.: 17/415,989

(22) PCT Filed: Dec. 13, 2019

(86) PCT No.: PCT/EP2019/085108
§ 371 (c)(1),
(2) Date: Jun. 18, 2021

(87) PCT Pub. No.: WO2020/126917
PCT Pub. Date: Jun. 25, 2020

(65) Prior Publication Data
US 2021/0381017 A1  Dec. 9, 2021

(30) Foreign Application Priority Data
Dec. 21, 2018  (FR) ........................... 1873761

(51) Int. Cl.
*C12P 19/14* (2006.01)
*C12P 19/02* (2006.01)
*D21B 1/02* (2006.01)

(52) U.S. Cl.
CPC ............... *C12P 19/14* (2013.01); *C12P 19/02* (2013.01); *D21B 1/021* (2013.01); *C12P 2201/00* (2013.01)

(58) Field of Classification Search
CPC ....... C12P 19/14; C12P 19/02; C12P 2201/00; D21B 1/021
See application file for complete search history.

(56) References Cited

U.S. PATENT DOCUMENTS

| 9,605,282 | B2 | 3/2017 | Aymard et al. |
| 10,214,751 | B2 | 2/2019 | Nilsen et al. |
| 2019/0241984 | A1 | 8/2019 | Hudebine et al. |

FOREIGN PATENT DOCUMENTS

| BR | 102014011796 A2 | * | 2/2016 | ................ C12P 7/06 |
| CA | 3040380 A1 | * | 5/2018 | ................ C07G 1/00 |

(Continued)

OTHER PUBLICATIONS

Chen, Xiangxue, et al. "Mixing alkali pretreated and acid pretreated biomass for cellulosic ethanol production featuring reduced chemical use and decreased inhibitory effect." Industrial crops and products 124 (2018): 719-725. (Year: 2018).*

(Continued)

*Primary Examiner* — Louise W Humphrey
*Assistant Examiner* — Candice Lee Swift
(74) *Attorney, Agent, or Firm* — Millen, White, Zelano & Branigan; Brion P. Heaney

(57) ABSTRACT

The present invention relates to a process for treating lignocellulosic biomass, successively comprising
b) a step of pretreatment of the biomass placed beforehand under acidic or neutral pH conditions in a pretreatment reactor (3), to produce an acidic or neutral pretreated must (AM),
alternating with
b') a step of pretreatment of the biomass placed beforehand under acidic, neutral or basic conditions, with (Continued)

optional sufficient introduction of a basic aqueous solution (EB) into the pretreatment reactor (3) to produce a basic pretreated must (BM), and then c) a step of enzymatic hydrolysis in a hydrolysis reactor (16) of a mixture of the acidic or neutral pretreated must (AM) obtained from step b) with the basic pretreated must (BM) obtained from step b').

16 Claims, 5 Drawing Sheets

(56) References Cited

FOREIGN PATENT DOCUMENTS

| | | |
|---|---|---|
| FR | 3043408 A1 | 5/2017 |
| WO | 14135755 A1 | 9/2014 |
| WO | 16066752 A1 | 5/2016 |
| WO | WO-2016066752 A1 * | 5/2016 ............. C02F 11/04 |
| WO | 18015227 A1 | 1/2018 |

OTHER PUBLICATIONS

Weiss, Noah D., et al. "High xylose yields from dilute acid pretreatment of corn stover under process-relevant conditions." Applied biochemistry and biotechnology 155 (2009): 115-125. (Year: 2009).*

Saha, Badal C., et al. "Dilute acid pretreatment, enzymatic saccharification, and fermentation of rice hulls to ethanol." Biotechnology progress 21.3 (2005): 816-822. (Year: 2005).*

AgMRC; https://www.agmrc.org/commodities-products/biomass/corn-stover#:~:text=Corn%20stover%20is%20the%20largest,percent%20of%20total%20gasoline%20needs.; accessed Apr. 9, 2024 (Year: 2022).*

International Search report PCT/EP2019/085108 dated Mar. 16, 2020 (pp. 1-3).

* cited by examiner

PROCESS FOR TREATING LIGNOCELLULOSIC BIOMASS

TECHNICAL FIELD

The invention relates to a process for treating lignocellulosic biomass for producing "second-generation" (2G) sugary liquors. These sugary liquors may be used to produce other products via a biochemical pathway (for example alcohols such as ethanol, butanol or other molecules, or solvents such as acetone, etc.).

This process involves various steps, generally including the three steps of liquor preparation, impregnation of the biomass with this liquor, and pretreatment of the impregnated biomass by cooking, notably with steam explosion.

PRIOR ART

Lignocellulosic biomass represents one of the most abundant renewable resources on Earth. The substrates considered are very varied, they relate both to ligneous substrates such as various woods (hardwoods and softwoods), coproducts derived from agriculture (wheat straw, corn cobs, etc.) or from other agrifood, paper, etc. industries.

The process for the biochemical conversion of the lignocellulosic material into 2G sugary liquors notably comprises a pretreatment step and a step of enzymatic hydrolysis with an enzymatic cocktail. These processes also usually include an impregnation step before the pretreatment. The sugary liquors resulting from the hydrolysis are then treated, for example by fermentation, and the process may also comprise separation steps and/or a step of purifying the end product.

These processes also usually include an impregnation step before the pretreatment. The sugary liquors resulting from the hydrolysis are then treated, for example by fermentation, and the process may also comprise separation steps and/or a step of purifying the end product.

An example of this sequence of steps for converting biomass into ethanol is described in patent WO 2014/135755.

Lignocellulosic biomass is composed of three main polymers: cellulose (35% to 50%), which is a polysaccharide essentially consisting of hexoses; hemicellulose (20% to 30%), which is a polysaccharide essentially consisting of pentoses; and lignin (15% to 25%), which is a polymer of complex structure and of high molecular weight, composed of aromatic alcohols connected via ether bonds. These various molecules are responsible for the intrinsic properties of the plant wall and are organized in a complex entanglement.

Among the three base polymers that make up lignocellulosic biomass, cellulose and hemicellulose are the ones that enable the production of 2G sugary liquors.

Usually, hemicellulose is predominantly broken down into monomeric and oligomeric sugars during the pretreatment, and cellulose is converted into glucose by enzymatic hydrolysis. However, access to the raw cellulose in the native substrate remains difficult for enzymes to access, hence the need for a pretreatment. This pretreatment makes it possible to modify the physicochemical properties of the lignocellulose so as to improve the accessibility of the cellulose to enzymes and its reactivity to enzymatic hydrolysis.

Numerous technologies of interest to the invention for performing this pretreatment exist, and will be referred to collectively hereinafter using the generic term "cooking", which involve heating the biomass at high temperature for a defined duration. Acidic cooking, in which the biomass is brought into contact with an acidic solution before/during the cooking, and alkaline cooking, in which the biomass is brought into contact with a basic solution before/during the cooking, are notably known. Also known is "steam explosion" (acidic, alkaline or impregnation-free) cooking, in which the biomass is subjected to pressurized steam.

There are also pretreatment processes known as "organosolv pulping". The latter process concerns pretreatment in the presence of one or more organic solvents and generally water. The solvent may be an alcohol (ethanol), an acid such as acetic acid or formic acid, or else acetone, or alternatively a mixture of these compounds. "Organosolv pulping" processes lead to at least partial dissolution of the lignin and partial dissolution of the hemicelluloses. There are thus two outlet streams: the pretreated substrate with residual cellulose, hemicellulose and lignin, and the solvent phase which contains the dissolved line and a portion of the hemicelluloses. There is generally a step of regeneration of the solvent which makes it possible to extract a lignin stream. Certain "organosolv pulping" treatments (notably with ethanol) may be coupled with the addition of a strong acid (such as $H_2SO_4$). It may also be envisaged to place the biomass in contact with the solvent via an impregnation reactor before the cooking phase or to place the biomass in contact with the acid catalyst before performing "organosolv pulping" cooking.

Various configurations are reported, for example, in the publication "Production of bioethanol from lignocellulosic materials via the biochemical pathway: a review", M. Balat, Energy Conversion and Management 52 (2011) 858-875, or in the publication "Bioethanol production from agricultural wastes: an overview", N. Sarkar, S. Kumar Ghosh, S. Bannerjee, K. Aikat, Renewable Energy 37 (2012) 19-27.

One of the most effective pretreatments is the abovementioned steam explosion cooking, as it enables almost complete hydrolysis of hemicellulose and a significant improvement in the accessibility and reactivity of cellulose to enzymes. This pretreatment can be preceded/followed by other treatment(s), and it is this which will more particularly be of concern to the invention, without, however, being limited thereto in its application.

It has been demonstrated that the reactors for the treatment of lignocellulosic biomass, notably those concerning the pretreatment of biomass of cooking type, were prone to fouling: heating the reaction medium in the reactor at high temperature results in the production of various solid residues which adhere to the internal walls of the reactor. These residues progressively accumulate over a time longer than the average residence time of the biomass in the reactor. They can gradually give rise to operating problems, for instance a risk of plugging of the outlet of the reactor or increased difficulty in conveying the biomass within the reactor, and, generally, their presence negatively impacts the performance characteristics of the reactor.

A first solution provided for eliminating these residues consisted in emptying the reactor, in thus stopping it, and in opening it, in order to clean the internal walls of the reactor by mechanical and/or hydraulic action, that is to say by scraping the walls and/or by delivering water under pressure at several hundred bar. This procedure is, admittedly, effective but is time-consuming and energy-intensive: it is necessary not only to stop the reactor but also to wait for it to cool (cooking is performed at a temperature above 100° C. and under pressure), and then to open it, perform the cleaning, close the reactor and return it to the operating temperature before restarting production.

The aim of the invention is consequently to overcome these drawbacks. More precisely, the aim of the invention is to develop an improved process for treating biomass which totally or partly eliminates these residues or totally or partly prevents their formation, while at the same time limiting any loss of yield/any immobilization of the equipment performing the process under consideration as a whole.

SUMMARY OF THE INVENTION

A subject of the invention is, firstly, a process for treating lignocellulosic biomass, successively comprising:
b) a step of pretreatment of the biomass placed beforehand under acidic or neutral pH conditions in a pretreatment reactor, to produce an acidic or neutral pretreated must,
alternating with
b') a step of pretreatment of the biomass placed beforehand under acidic, neutral or basic conditions, with optional sufficient introduction of a basic aqueous solution into a pretreatment reactor to produce a basic pretreated must,
and then
c) a step of enzymatic hydrolysis in a hydrolysis reactor (16) of a mixture of the acidic or neutral pretreated must (AM) obtained from step b) with the basic pretreated must (BM) obtained from step b').

Advantageously, during step c) of enzymatic hydrolysis of the mixture of acidic or neutral pretreated must (AM) with the basic pretreated must, said mixture may be replaced with only acidic or neutral pretreated must for a portion only of the duration of said step c).

The term "successively" means that the steps are listed in the order in which the biomass is treated and passes through the facility, irrespective of the fact that the process may involve steps that are intermediate, prior or subsequent to those listed.

The invention has thus discovered that the cleaning and/or prevention of fouling of the pretreatment reactor according to the invention is achieved by placing the biomass in contact with a basic aqueous solution (which may also be referred to hereinbelow as a basic "liquor"), for example a solution containing KOH, during the actual pretreatment of the biomass: the cleaning thus takes place while continuing the feeding of biomass to the reactor. The cleaning of the reactor is thus performed with a reactor at least partially filled with biomass, which was able, prior to its pretreatment in the reactor in question, to be preimpregnated with an acidic, neutral or oxidizing aqueous solution.

The basic solution may already be present in the biomass when it has been preimpregnated with a basic solution before being introduced into the pretreatment reactor; only subsequently is it possible, in this reactor, to provide the necessary supply of base, where appropriate. If the biomass which feeds the pretreatment reactor is not basic, then the addition of basic solution to the pretreatment reactor will be essential.

The cleaning according to the invention is performed by two combined actions: it is first chemical, with the action of the basic solution which has been shown to be suitable for detaching and/or dissolving the solid residues sticking to the internal walls of the reactor, but it is also mechanical, the biomass particles exerting an abrasive action, in addition, on said residues.

It is a markedly simpler process to implement than mechanical or hydraulic cleaning: this is because it can be performed without having to open the reactor, since it suffices to provide inlets/outlets for basic aqueous solution (or to reuse fluid inlets/outlets already present).

It is performed without even having to stop the production of pretreated biomass: surprisingly, it turned out that the presence of biomass has an abrasive effect, and thus a positive effect on the cleaning of the reactor as mentioned above, but above all it also turned out that the biomass which is present in the reactor with the basic solution is exploitable/upgradable: the pretreatment also functions correctly during the cleaning phase, the biomass can be used for the rest of the process, and such is the case even if, prior to its pretreatment, it has undergone impregnation with an acidic or neutral or oxidizing solution.

In addition, unlike mechanical/hydraulic cleaning with opening of the reactor, it is not necessary to wait for the reactor to cool in order to perform the cleaning. On the contrary, it has even turned out that performing the cleaning during the hot pretreatment, of the cooking type (with or without steam explosion), is very favorable to the detachment of the residues. As the reactor can remain hot during cleaning, there is no need to return it to the operating temperature, since there is no production stoppage, thus no restarting either to be planned for thermally.

On the other hand, it turned out that the basic pretreated must, the material obtained in step b'), reacted markedly less well to the following enzymatic hydrolysis than the conventional acidic or neutral pretreated must obtained in step b) when it is used alone. The hydrolysis yield, or the degree of conversion into alcohol when the hydrolysis is concomitant with fermentation, are lower. Considering, moreover, that this "basic" pretreated must had to be discarded and could not be upgraded would also have led to an overall loss of yield for the biomass treatment process.

The invention then overcame this obstacle by envisaging to feed the hydrolysis reactor not alternately with basic must and acidic/neutral must, depending on whether the pretreatment takes place according to step b) or b') (nor by "eliminating" the basic must), but by feeding it with a mixture of "conventional" acidic or neutral must along with this basic must.

This mixing may be performed in several ways, either by providing a single basic must buffer zone, from which material is subsequently taken to be added to the conventional acidic/neutral must, or by providing two buffer zones, one for the basic must, the other for the acidic/neutral must, from which zones given amounts are taken to have the mixture in the desired proportions in the enzymatic hydrolysis reactor.

It should be noted that the enzymatic hydrolysis may be performed either continuously, by feeding the hydrolysis reactor from the pretreatment reactor, or batchwise, and thus not continuously, and the choice of the way in which the mixing is performed and the number of buffer zones will also depend on this mode of functioning.

In the case with two buffer zones, one for the conventional acidic/neutral must and one for the basic must, different retention times are preferably chosen for the acidic/neutral must and for the basic must. These buffer zones thus make it possible to uncouple the production of must pretreated during the pretreatment step from the feeding with musts of the downstream enzymatic hydrolysis step. It thus becomes possible to feed the enzymatic hydrolysis only with a mixture of acidic/neutral must with basic must, optionally interrupted with feeding only with conventional acidic/ neutral must when the basic must has been entirely consumed. Surprisingly, this mode of functioning made it possible to preserve the enzymatic hydrolysis yield relative to a hydrolysis performed 100% using acidic/neutral must, by adjusting the ratios of the two types of biomass in the mixture. The pH of the mixture is thus adjusted, notably to a level closer to the level that is the most suited to the enzymatic cocktail used, generally to a pH slightly above the pH of the conventional acidic pretreated musts (although remaining acidic).

The invention thus makes it possible to ensure a longer duration of functioning of the pretreatment reactor by slowing down its fouling, without, however, negatively impacting the yield for the steps following the pretreatment, notably the enzymatic hydrolysis, whereas it might have been believed that the "basic" pretreated must would not be upgradable or would disrupt these subsequent steps, and does so by combining two features: a pretreatment which periodically switches to basic pH rather than to acidic or neutral pH, combined with a specific pipe for feeding with pretreated must (acidic/neutral or basic) of the enzymatic hydrolysis adapting to this basic must.

It should be noted, naturally, that, at the outlet of the pretreatment reactor, on switching from step b) under acidic/neutral conditions to step b') under basic conditions in the pretreatment reactor, the pretreated must leaving the reactor does not abruptly switch from an acidic/neutral must to a basic or less acidic must: over a certain period, a "transition" must, the pH of which gradually increases, is withdrawn from the pretreatment reactor. Similarly, on switching again from a pretreatment under basic conditions of type b') to a pretreatment under acidic/neutral conditions of type b), there is once again over a certain period, at the reactor outlet, another must known as "transition" must, the pH of which this time falls gradually. It is thus possible to choose arbitrarily, in each of the cases, a threshold value, notably of pH or representative of the pH, of the pretreated biomass leaving the pretreatment reactor in order to assess whether the must in question is a must of acidic/neutral type or a must of basic type.

Advantageously, the mixing of the acidic or neutral pretreated must obtained from step b) with the basic pretreated must obtained from step b') in step c) is performed upstream of the hydrolysis reactor, or directly in the hydrolysis reactor.

In the first case, it is thus possible to perform the mixing, in step c), of the acidic or neutral pretreated must obtained from step b) with the basic pretreated must obtained from step b') by making withdrawals from one or more buffer zones, as mentioned above. These buffer zones are temporary storage zones, which may take the form of storage vessels or other storage means, such as a hopper.

As explained above, step b') of pretreating the biomass with sufficient introduction, where appropriate, into the pretreatment reactor of a basic aqueous solution (EB) to produce a basic pretreated must is a step of cleaning the pretreatment reactor, while continuing to produce must, the features of which, notably in terms of pH, are, however, different.

Preferably, a step of adjusting the pH of the pretreated biomass or of the mixture of pretreated biomasses before or during the enzymatic hydrolysis step c), notably an adjustment of the pH to between 4 and 6, is envisaged. When the must being treated is thus an acidic/neutral must, it generally suffices to adjust the pH upward to this pH range by supplying base. When the must being treated is a must mixture including basic must, the pH can be adjusted solely by adjusting the relative amount of the two types of must in the mixture, or else by also providing a supply of base/acid if necessary to reach the desired pH range. This pH adjustment toward pH values that are acidic but lower than the pH values encountered in pretreatments under acidic conditions (where the biomass may "fall" to pH values of 2 to 3.5) is in fact generally favorable toward the activity of the enzymes of cellulase type used in the enzymatic hydrolysis.

Advantageously, over a given production time, the sum of the durations of the steps b) of pretreatment of the biomass placed beforehand under acidic or neutral pH conditions in a pretreatment reactor, to produce an acidic or neutral pretreated must, is greater, notably at least 2 to 5 times and preferably between 5 and 20 times greater, than the sum of the durations of the steps b') of pretreatment of the biomass placed beforehand under acidic, neutral or basic conditions, with optional sufficient introduction into the pretreatment reactor of a basic aqueous solution, to produce a basic pretreated must.

According to one variant, the biomass feed rate of the pretreatment reactor of the pretreatment step b) is the same as the feed rate of step b'). According to another variant of the invention, the biomass feed rate of the pretreatment step b) is higher than the biomass feed rate of step b'). Thus, over a given period, the ratio of the sum of the amounts of biomass treated in step b) to the amounts of biomass treated in step b') is preferably greater than the ratio of their respective production times.

According to the invention, it is thus preferred to have pretreatments under basic conditions that are shorter than those under acidic/neutral conditions, both operation by operation and over the entire production period (which is understood as being the period between the starting of the facility and its stoppage, notably for maintenance purposes): the pretreatment under acidic/neutral conditions preferably remains largely predominant in duration, the pretreatment under basic conditions essentially being performed only for purposes of cleaning the pretreatment reactor and is limited to the time just necessary to do so.

Advantageously, a separation can be performed between biomass and aqueous phase in the liquid or vapor form at the outlet of the pretreatment reactor, with a separation device or several separation devices in parallel, notably two separation devices, operating alternately.

According to the invention, optionally, each step b') of pretreatment of the biomass placed beforehand under acidic, neutral or basic conditions, with sufficient introduction, where appropriate, into the pretreatment reactor of a basic aqueous solution, to produce a basic pretreated must, is followed by rinsing, at least once, the separation device or one of the separation devices with an aqueous solution (E), notably between 1 and 10 successive rinses.

According to a particular embodiment, use may be made of several separation devices in parallel, operating alternately, at the outlet of the pretreatment reactor, and, in this case, it is possible to rinse one of the separation devices batchwise, while the other separation device(s) continue to function.

Advantageously according to the invention, during the enzymatic hydrolysis step c) in the hydrolysis reactor, the mixing of the acidic or neutral pretreated must AM obtained from step b) with the basic pretreated must BM obtained from step b') is performed in an AM/BM weight ratio of at least 80/20 expressed as crude weight, notably an AM must content of greater than 85% by weight, and preferably 90% by weight or 95% by weight, expressed as crude weight of the must mixture and/or a content of basic must of at least 3%, notably of at least 5% or 8% or 10%, notably between 5% and 15%.

The enzymatic hydrolysis may be performed in various ways: this step may be performed in batch mode, in fed-batch mode or continuously. For example, the enzymatic hydrolysis may be performed with a first batch phase in which the basic must BM is introduced as a mixture with acidic/neutral must AM into the hydrolysis reactor, this introduction being followed by establishing the appropriate pH by adjustment with a neutralization solution, followed by introduction of the enzymes. This initial batch phase may be followed by a must fed-batch phase, which may be performed by feeding with acidic/neutral must AM only, or by a mixture of acidic/neutral must AM with basic must BM. At the end of the fed-batch feeding, the hydrolysis may be continued in batch mode for a given time, before emptying the entire reactor at the end of the reaction.

Preferably, the pretreatment step b) is preceded by a step a) of impregnating the biomass with an acidic or neutral aqueous solution, in an impregnation reactor.

A subject of the invention is also a facility for treating lignocellulosic biomass (notably for performing the process described previously), and which comprises, from upstream to downstream:
  a biomass impregnation reactor in fluid connection with a vessel for preparation of an acidic aqueous solution,
  a reactor for pretreatment of the impregnated biomass, in fluid connection with a vessel for preparation of a basic aqueous solution,
  a pretreated biomass separation device downstream of the pretreatment reactor, which is optionally combined with means for rinsing with an aqueous solution and which is in fluid connection with
  optionally a zone for intermediate storage of biomass impregnated with acidic aqueous solution, and
  another zone for intermediate storage of biomass impregnated with basic solution, and
  an enzymatic hydrolysis reactor fed with pretreated biomass from said/at least one of said storage zones.

The terms "upstream" and "downstream" are understood as a function of the general direction of conveying of the biomass in the facility.

The facility may also comprise a zone for adjusting the pH of the biomass between at least the/one of the storage zones and the enzymatic hydrolysis reactor, notably a pH adjustment zone that is common for the biomasses obtained from the storage zones.

Advantageously, according to one variant, this pH adjustment zone may be a vessel which ensures the mixing of the biomasses obtained from each of the storage zones.

According to another variant, the pH adjustment is performed in the hydrolysis reactor before or during the enzymatic hydrolysis step.

The mixing of the musts may be performed directly in the enzymatic hydrolysis reactor or prior to introducing them into the reactor.

According to one variant, the acidic/neutral must and the basic must are introduced by means of the same introduction system into the enzymatic hydrolysis reactor, this system also possibly serving for the introduction of the mixture of acidic/neutral and basic musts. According to another variant, two different must feed systems are provided depending on whether the feeding is performed with acidic/neutral must or with basic must or must mixture).

Details regarding the way in which to perform the optional impregnation, the pretreatment and the separation after pretreatment according to the invention are given below: (step b') of pretreatment under basic conditions may also be referred to as the step of cleaning the pretreatment reactor: these correspond to the same step).

Advantageously, it may be envisaged to heat the basic aqueous solution before it is introduced into the pretreatment reactor, notably to a temperature of at least 40° C., notably of at least 80° C. It has been found that the basic solution is effective more rapidly if it is thus preheated outside the reactor.

Advantageously also, the introduction of the basic solution into the pretreatment reactor may be performed in the pretreatment reactor, the internal volume of which is at a temperature of at least 120° C., notably of at least 140° C. This internal temperature of the reactor may be that at which the pretreatment is conventionally performed, notably by cooking. This is because the effect of the basic solution on the solid residues stuck to the walls of the reactor is amplified when the solution/the reactor are hot.

According to one embodiment of the invention, the biomass is introduced into the pretreatment reactor via a conveying means with pressurization, of the conical screw conveyor type, which is washed with an aqueous solution, and this washing solution is recycled to prepare the basic aqueous solution used during the cleaning of said reactor. The increased water consumption of the pretreatment process, which is due to the use of a basic aqueous cleaning solution, is thus reduced.

Preferably, the phase of cleaning the pretreatment reactor with the basic solution has a duration of between 15 minutes and 8 hours, notably between 1 and 3 hours. This duration is thus not very long and can be adjusted as a function of the frequency with which the reactor is cleaned.

During the phase of cleaning the pretreatment reactor, the flow rate of the basic aqueous solution at the inlet of said reactor is preferably adjusted so that the solids content SC of the biomass significantly decreases during its passage through the reactor, for example from a value of 30% to 60% SC, notably 50% SC, to a value of 15% to 25% SC, notably 25% SC. This is because the basic aqueous solution will have a first role, which is to impregnate the biomass entering the reactor with water until the biomass is saturated with liquid.

Throughout the present text, the abbreviation "SC" denotes the solids content, which is measured according to the standard ASTM E1756-08(2015) "Standard Test Method for Determination of Total Solids in Biomass".

Subsequently, and this is its second role, the concentration of base (for example KOH) of the basic aqueous solution is preferably adjusted so as to increase the pH of the biomass entering the reactor from an acidic pH range of between 0.5 and 3, preferably in the region of 3, to a basic pH range of between 8 and 14, preferably in the region of 13. (This is then the case of a pretreatment of a biomass preimpregnated with an acidic liquor, and it is thus necessary to switch to a basic pH in order to perform the cleaning according to the invention.)

By adjusting the flow rate and the concentration of base of the solution, it is possible to saturate the biomass with water and to raise its pH, the precise amounts of basic solution consumed during a cleaning procedure naturally depending on the size of the reactor and the characteristics of the biomass entering the reactor.

Preferably, the degree of filling of the reactor with the biomass during the treatment is between 20% and 80% or 90%. During the cleaning phase, this degree of filling can be kept within this range, and even, preferably, (slightly)

increased (for example by reducing the rotational speed of the screw or of at least one of the internal conveying screws of the reactor when such are present), which tends to improve the quality of the cleaning.

The phase of continuous cleaning of the pretreatment reactor is performed at a given frequency and/or when a threshold value of a physicochemical or rheological characteristic of the reaction medium in said reactor is exceeded. This characteristic can be measured or evaluated directly or indirectly. It may, for example, be a power threshold of the motor used to rotate a conveying screw in the reactor, to rotate stirring means in the reactor or any other moving part therein.

According to one embodiment, it is possible to change one of the physical, chemical or rheological characteristics or the nature of the biomass feeding the pretreatment reactor during at least a part of its cleaning phase. This is because it may be advantageous, during the time of the cleaning, to feed the pretreatment reactor with a biomass which has an abrasive power greater than that of the biomass used during the remainder of the production time. For example, it is thus possible to replace straw-type biomass during the production with poplar-type biomass during the cleaning.

Advantageously, the pretreatment according to the invention is cooking with steam explosion. It is then possible to thermally deplete the heat of the recovered steam, notably in a separation device of cyclone type at the outlet of the pretreatment reactor, to heat the or one of the aqueous solutions used in said process.

The pretreatment may be performed by cooking, with or without steam explosion.

According to a preferred embodiment, the biomass is impregnated with an acidic aqueous solution in an impregnation reactor, before it is introduced into the pretreatment reactor. The two reactors can be mounted in series and can operate continuously. The fact that, temporarily, the acidified biomass is placed in contact with a basic solution in the pretreatment reactor does not significantly affect the quality or production yield of pretreated biomass: even if the biomass pretreated during the cleaning operation may have differences with the biomass pretreated outside the cleaning operation, notably pH values which rise and then fall again gradually, it remains exploitable, insofar as, as explained above, it is combined in suitable proportions with biomass pretreated under acidic/neutral conditions before enzymatic hydrolysis.

According to one embodiment, during at least a part of the phase of continuous cleaning of the pretreatment reactor, the acid content of the acidic aqueous solution brought into contact with the biomass during its prior impregnation in the impregnation reactor is reduced or eliminated. It is thus possible to reduce the amount of base required for the preparation of the basic cleaning solution, since the amount of acid contained in the biomass to be neutralized will thus be lower.

According to another embodiment, during at least a part of the phase of continuous cleaning of the pretreatment reactor, the acidic aqueous solution brought into contact with the biomass, during its prior impregnation in the impregnation reactor, is replaced with a basic aqueous solution, notably the same as that which is injected during said phase into the pretreatment reactor: it is thus possible to further reduce the consumption of base required for the cleaning in comparison with the preceding embodiment. It may also be replaced with an aqueous solution of neutral pH, again for the same reason.

According to one variant, several, notably two, impregnation reactors are used in parallel to impregnate the biomass with an aqueous solution before it is introduced into the pretreatment reactor: a first impregnation reactor is fed with acidic aqueous solution, and a second impregnation reactor is fed with basic aqueous solution or with aqueous solution of neutral pH, the two reactors operating alternately, the second reactor being operational during at least a part of the phase of cleaning the pretreatment reactor. This variant makes it possible to implement the preceding embodiments, by modifying the type of impregnation of the biomass before its pretreatment when the pretreatment reactor goes into cleaning mode, by switching the arrival of biomass to be impregnated from one impregnation reactor to the other.

Preferably, a separation may be performed between biomass and aqueous phase in liquid or vapor form at the outlet of the pretreatment reactor, with a separation device or several separation devices in parallel, notably two separation devices, operating alternately. Such equipment may be of cyclone type.

As previously for the two impregnation reactors in parallel, using several separation devices in parallel makes it possible to reduce the transition period between the production mode and the production+cleaning mode of the pretreatment reactor: with two devices in parallel, one of the two devices can be dedicated to the separation of the "basic" pretreated biomass (that pretreated during the cleaning), by separating only the biomass pretreated during cleaning, and the other device is then dedicated to the conventional separation of the pretreated biomass with acidic or neutral impregnation (that pretreated outside the cleaning period). The facility according to the invention may comprise two impregnation reactors and/or two separation devices and/or two pretreatment reactors operating alternately depending on whether the pretreatment is performed on biomass placed beforehand under acidic or neutral pH conditions to produce an acidic or neutral pretreated must, according to step b), or on biomass placed beforehand under acidic, neutral or basic conditions, with sufficient introduction into the pretreatment reactor of a basic aqueous solution (EB) to produce a basic pretreated must according to step b').

The implementation of the proposed invention thus adds simply to an existing facility, in its simplest embodiment:
  optionally, a vessel for preparing the basic solution, which can be fed with water, with concentrated base (KOH or NaOH, for example, or any other mineral or organic base) and optionally with water/recycled basic solution. This vessel is equipped with known means for, notably, keeping the pH of the solution constant, by addition of base (KOH) and/or of water.
The vessel may also be equipped with heating means tor bringing the basic solution to/maintaining the basic solution at the desired temperature before introduction into the reactor. The heating means may, alternately or cumulatively, be provided on the pipe-type fluid connection means bringing the basic solution from the vessel to the reactor,
  means for performing the mixing between the must pretreated under acidic/neutral conditions and the must pretreated under basic conditions (one "buffer" zone for intermediate storage of basic must, optionally another for storage of acidic/neutral must; or even a third for performing the mixing and adjusting the pH before sending to the hydrolysis reactor). The buffer zone(s) may be in the form of vessels or in the form of any other known intermediate storage means, for instance a hopper.

A subject of the invention is also the use of the process or of the facility described above for the treatment of biomasses of the type such as wood, straw, agricultural residues, and all dedicated energy crops, notably annual or perennial plants, such as miscanthus, for the purpose of producing sugars, biofuels or biobased molecules.

A subject of the invention is also a process for the treatment of lignocellulosic biomass, comprising the following steps:
- preparation of an impregnation liquor containing a catalyst, notably an acid catalyst,
- introduction of the biomass into an impregnation reactor to be impregnated with the impregnation liquor,
- transfer of the impregnated biomass into a pretreatment reactor to undergo pretreatment therein by cooking,
- enzymatic hydrolysis of the pretreated biomass,
- alcoholic fermentation of the enzymatic hydrolysis must obtained, such that the process is performed continuously over all or some of said steps, and such that cleaning of the impregnation reactor is performed without stopping its production of pretreated biomass.

The facility in question may use two impregnation reactors and/or two separation devices and/or two pretreatment reactors, operating alternately depending on whether the pretreatment reactor is or is not in the cleaning phase.

A subject of the invention is also any facility for the implementation of the biomass treatment process mentioned above, such that this facility comprises, successively:
- an impregnation reactor fed with impregnation solution via a vessel for preparation of said solution, and with biomass,
- a reactor for pretreatment of the impregnated biomass which may be fed with basic aqueous solution via a vessel for preparation of said solution,
- an enzymatic hydrolysis reactor, and
- an alcoholic fermentation reactor which may be the same as the hydrolysis reactor, all of the reactors, or at least two of them, being mounted in series.

It should be noted that the hydrolysis and the fermentation may also be performed at the same time in the same reactor.

LIST OF FIGURES

DESCRIPTION OF THE EMBODIMENTS

Figure 1:
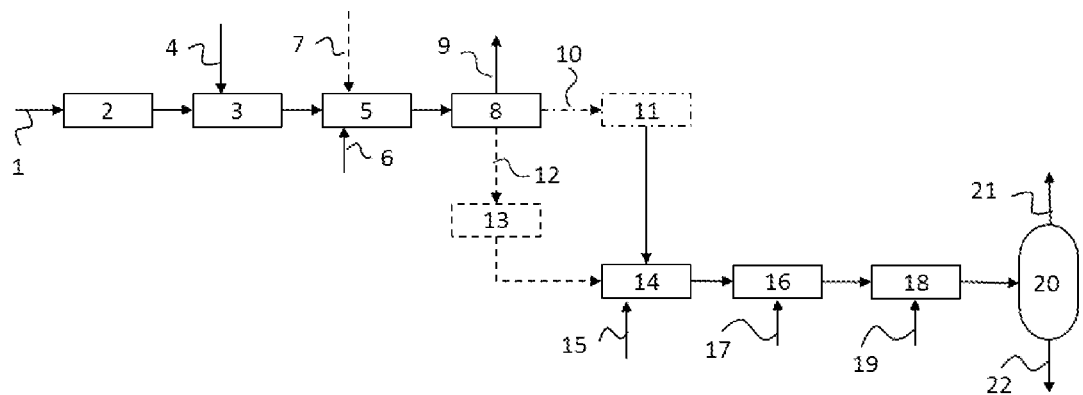
FIG. 1 is a block diagram of an embodiment of a process for treating lignocellulosic biomass according to the invention.

FIGS. 1 to 5 are very diagrammatic: the same references correspond to the same components from one figure to another. FIG. 1 is a block diagram. In the following figures, the reactors and other equipment are represented in the spatial position that they occupy substantially in the operational position, without the details or equipment that are of lesser importance for the purposes of the invention.

The lignocellulosic biomass treatment process including the continuous cleaning of a biomass pretreatment reactor under basic conditions alternating with a conventional pretreatment under acidic or neutral conditions is illustrated here in the context of a biomass treatment process intended to produce alcohols, notably bioethanol-type biofuel. The major steps of this process are described in FIG. 1, and rapidly described below. An embodiment of this process is described in greater detail, for example, in patent WO 2018/015227, to which reference will be made if necessary.

It should be noted that the process of the invention may be applied in the same manner to any pretreatment followed by an enzymatic hydrolysis of biomass, and to any reactor which is intended for treating a lignocellulosic biomass.

The biomass treatment process illustrated here and represented in FIG. 1 schematically involves the following major steps: a first step of impregnating the biomass in a vertical reactor, followed by a step of pretreating the biomass, once impregnated, in a horizontal steam explosion reactor, then a step of enzymatic hydrolysis, then an alcoholic fermentation (the hydrolysis and fermentation possibly taking place simultaneously in the same reactor or one after the other) and then fractionation by distillation. It is into this sequence of steps that the invention is integrated, as represented in FIG. 1 described below.

The references of FIG. 1 correspond to the following equipment and compounds, from upstream to downstream, in the biomass treatment facility:
1: native biomass (i.e. biomass before any treatment)
2: conditioning of the native biomass (grinding, stone removal, removal of dust, if any, etc.)
3: zone for contacting the conditioned biomass with an acidic (aqueous phase) liquor (impregnation)
4: acidic liquor ($H_2SO_4$ in aqueous phase)
5: reactor for pretreatment by cooking—continuous functioning
6: steam injection—continuous functioning
7: injection of aqueous solution of base—functions during sequence T2 only (detailed later)
8: cyclone-type separation equipment—functions continuously
9: vapors separated from the pretreated biomass substrate—evacuated continuously
10: exiting of the must produced under acidic conditions—functions during sequence T1 only (detailed later)
11: acidic must buffer zone, fed only during sequence T1 and withdrawn during T1 and during T2
12: exiting of the must produced under basic conditions—functions during sequence T2 only
13: basic must buffer zone, fed only during sequence T2 and withdrawn at least partly during T1

14: zone for must neutralization to reach a pH of between 4 and 6
15: neutralization solution
16: enzymatic hydrolysis reactor
17: cocktail of enzymes and other necessary nutrients+pH readjustment
18: zone for ethanolic fermentation (separate from or concomitant with the hydrolysis)—$CO_2$ removal not shown
19: fermentation yeasts and other necessary nutrients+pH readjustment
20: ethanol recovery device, for example distillation
21: ethanol product
22: residues (solid and liquid, as mixtures or separated depending on the arrangement of 20)

Returning to FIG. 1, the conventional steps of the process are first described: The native biomass 1 is first conditioned in step 2, notably to give it a given particle size (grinding), to remove the stones and other components that do not form part of the biomass itself. It is then impregnated with an acidic aqueous solution 4 in an impregnation reactor 3.

The acid-impregnated biomass is then conveyed into a pretreatment reactor 5 at high temperature with injection of steam 6 to undergo cooking therein by steam explosion. A vapor phase 9 is then separated from the pretreated biomass, also known as must, in this case an acidic must AM, in cyclone-type separation equipment 8. Next, this acidic must is conveyed into a neutralization zone 14 to adjust the pH to a slightly higher value, to go from a pH of the order of 2 to 3.5 to a pH of the order of 4 to 6 by adding a neutralizing agent 15, and this neutralized must NM then undergoes enzymatic hydrolysis in an ad hoc reactor 16 fed with a suitable enzymatic cocktail 17, followed by ethanolic fermentation 18 (which may be concomitant with the hydrolysis), in the same reactor or in a different reactor, with a supply of suitable fermentation yeasts 19. Finally, provision is made to recover the alcohol 21 by separating it from the solid and liquid residues 22 in a device 20, which may be a distillation column.

The contribution of the invention to this sequence of conventional steps is now described: The invention proposes functioning in two sequences T1 and T2 which alternate.

Figure 2:
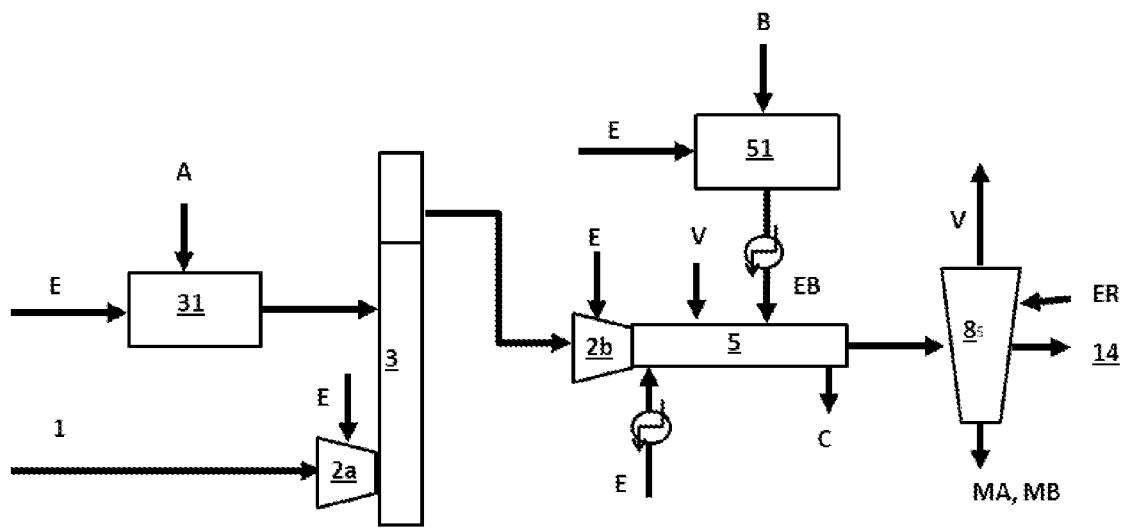
FIG. 2 shows a portion of the facility suitable for performing the process according to FIG. 1.

Sequence T1 is the conventional sequence, also illustrated by FIG. 2, with, at the outlet of the pretreatment reactor 5, an acidic must 10, but, in this case instead of being sent directly into the neutralization zone 14 after separation in the separating device 8, this must AM passes via a buffer zone 11 for acidic must 10, for example a hopper, which is fed with must only during the sequence T1, The sequence T2 is the sequence in which the pretreatment reactor is fed with basic aqueous solution 7, notably by means of a preparation vessel connected to the pretreatment reactor 5, from which is then withdrawn a basic must 12, which feeds a buffer zone 13 for basic must 12 (or BM).

The neutralization zone 14 is fed independently of the sequences T1 and T2. During a sequence T3, it is fed only with acidic must 10 coming from the buffer zone 11 and/or directly with the must at the outlet of reactor 10 when said reactor is functioning according to the sequence T1. During a sequence T4, it is fed with a mixture of acidic must 10 (or AM) coming from zone 11 and of basic must 12 (or BM) coming from zone 13, in a defined proportion. The neutralization to be performed in zone 14 is then less pronounced than during the sequence T3, since the must mixture is at a higher pH than that of the acidic must alone; it may even possibly be no longer necessary to perform neutralization by supplying base at this stage. The following steps remain unchanged. Alternatively, if the ratio between the two types of must in the mixture is chosen in consequence, it is possible to bypass the neutralization zone 14 during the sequence T4 and to inject directly the must mixture or each of the musts separately, coming from their respective buffer zones, into the enzymatic hydrolysis reactor 16.

In an implementation variant, the neutralization zone 14 may be located in the enzymatic hydrolysis reactor 16. Said reactor then receives the musts and the neutralization solution 15 in addition to the enzymatic solution 17.

The facility that is suitable for performing the invention according to the process of FIG. 1, up to the separation step with the device 8, is shown in FIG. 2. These steps of the process are performed continuously and are described in detail below using the description of the equipment used to implement it:

A vessel for preparation 31 of an impregnation liquor containing a chemical catalyst is provided, which liquor is formed from water E and from catalyst A which feed it; the catalyst in this instance is a strong acid of concentrated sulfuric acid type in an aqueous phase, this vessel making it possible to feed the impregnation reactor 3 with a mixture of water E and of chemical catalyst A, A conical screw 2a (also known as a plug screw or sealing screw) for feeding fresh biomass 1 (in this instance wheat straw) into the impregnation reactor 3, A line for feeding the reactor with impregnation liquor connecting the liquor preparation vessel 31 and the impregnation reactor 3, An impregnation reactor 3 equipped with two ascending transportation screws (not shown) making it possible for the biomass to pass from the impregnation zone in the lower part of the reactor to the draining zone in the upper part of the reactor, and to convey the impregnated and drained biomass to the reactor outlet located at the top of the reactor.

This impregnated and drained biomass is subsequently sent for pretreatment by means of a feed line emerging in a second conical screw 2b.

This second conical screw 2b feeds impregnated biomass to the pretreatment reactor 5, The pretreatment reactor 5 treats the impregnated biomass by steam explosion, A water circuit for washing the conical screws 2a,2b of the impregnation reactor 3 and of the pretreatment reactor 5, represented symbolically in FIG. 1 by water inlets E at said screws, is provided.

A means for separation of the steam 8 is fed by the reactor 5 with biomass which has undergone cooking by steam explosion, for example of cyclone type, with at the top outlet steam V and at the bottom outlet the pretreated/exploded biomass, also called the acidic must (or acidic must) AM.

This must AM has at this stage a sufficient accessibility of the cellulose to enzymes to be treated by enzymatic hydrolysis for the production of 2G sugars. The conditions of the enzymatic hydrolysis and of the consecutive or simultaneous fermentation which follow this separation (not shown in FIG. 1) are suitable for the desired products and are known to those skilled in the art.

The use of the pretreatment technique described above results in the deposition of different types of biomass (wheat straw here, but also miscanthus, poplar, and the like), which accumulate on/adhere to the surface of the screw 2b and of the pretreatment reactor 5. These deposits undergo cooking over times longer than the normal residence time of the biomass in the reactor, and are transformed into a residue, which can be called here "coke". This "coke" can cause various operating problems, such as blockages of the outlet orifice of the reactor 5 or an increase in the frictional actions of the screw 2b on the wall of the chamber in which it is housed, and this may result in a reduction in the performance characteristics of the pretreatment unit as a whole as shown in FIG. 2.

The definition of the composition of the "coke" proved to be problematic because it concerns a residue whose appearance and composition change over time: at the start of a production cycle, the material which is deposited is biomass; it thus has essentially the same characteristics as the biomass which continues its journey through the reactor 5 and toward the downstream steps. The deposit which is formed by adhesion to the internal wall of the reactor 5 will remain for a much longer time under the cooking conditions (notably the temperature) than desired. The effect of the temperature affects the composition and morphology of the residue, which will change toward an increasingly "cooked" residue. The more the residue is "cooked", the more compact it is and the more it adheres to the walls of the reactor.

These "coke" deposits are cumulative: the longer the continuous operating time of the tool, the greater the amount of coke deposited, and the more the "layers" of coke close to the wall will change into a very hard solid. These deposits thus cause fouling, by increasing the thickness of the walls and reducing the working volume of the reactor. Depending on the configuration of the cooking reactor, and notably the type of inserts in place, certain elements may be seen to have their rotation affected, such as the screw conveying the biomass undergoing cooking. This interference is notably observed by an increase in the power of the motor rotating the screw.

Throughout production, it is also possible that a more or less hardened section of this residue breaks off from the wall of the reactor, under the effect, for example, of the rotation of the screw or of the passage of the biomass through the reactor: accordingly, particles with a density much greater than the bed of biomass undergoing cooking may be caused to become detached and be carried toward the outlet orifice of the reactor, and this may give rise to clogging or operational problems downstream. Despite these detachments, it is found that the deposits continue to increase over time during a given production cycle.

After stopping, cooling and opening the cooking reactor 5, it was observed that the coke is present in two forms: a hard form in direct contact with the internal walls of the reactor and a more friable form which covers the hard coke. The difference between these two cokes is found in their elemental compositions, as shown in table 1 below.

|  | Friable coke | Hard coke |
| --- | --- | --- |
| Carbon content (%) | 44.57 | 65.07 |
| Hydrogen content (%) | 5.85 | 4.67 |
| Oxygen content (%) | 34.63 | 24.58 |

It is observed that the percentage of carbon contained in hard coke is higher than that in friable coke, while an opposite trend is noted for the oxygen content, and similar values are noted for the hydrogen content. It emerges from this that the friable coke is, as it were, the precursor of the dense coke.

The invention consists in continuing the operation of the two impregnation 3 and pretreatment 5 reactors, while performing the chemical cleaning of the reactor 5 so as to extract this coke C and/or to slow down its formation, without "losing" the must produced during this cleaning under basic conditions.

This cleaning does not require the opening of the reactor and the mechanical cleaning of the interior of the reactor, as was previously the case. This cleaning according to the invention, described in detail below, is thus faster, more economical and safer, since it makes it possible to limit the operating risks associated with the assembling and dismantling of the unit and, above all, since it makes it possible to not have to stop the production.

An example of implementation of the process according to the invention requires the following additional equipment, with respect to those already described, in the light of FIG. 1:

A vessel for preparation 51 of a cleaning liquor/basic liquor EB containing a base. This vessel 51 makes it possible to feed the pretreatment reactor 5 with basic solution at a certain concentration. It is fed with water E and with base B (for example from a base B in the form of a concentrated aqueous solution of KOH), the supply of which is adjusted to obtain a liquor with the desired concentration of base and the desired pH.

A line for feeding the reactor 5 with cleaning liquor, connecting the cleaning liquor/basic liquor preparation vessel 51 and the pretreatment reactor 5 to be cleaned, where appropriate preheating it by ad hoc items of equipment (heating resistors surrounding the pipes, for example), with items of equipment suitable for injecting the cleaning liquor into the reactor 5 under pressure, An optional rinsing water inlet ER for the cyclone 8.

Also provided, but not shown, are one or more temporary storage vessels or hoppers or other temporary storage means, the "buffer zones" mentioned above suitable for recovering, in one of the vessels, the conventional acidic must AM and, in the other vessel, the basic must BM obtained during cleaning of the pretreatment reactor 5 under basic conditions.

The procedure of an implementational example of the cleaning process/sequence T1 according to the invention comprises two consecutive sub-sequences:

sub-sequence 1: Injection of the preheated basic liquor EB into the reactor 5 while the reactor is being fed with the acidic biomass.

The injection conditions are as follows:

the basic solution EB is an aqueous KOH solution, with a KOH concentration of from 1% to 50% by weight of KOH, preferably from 5% to 12% by weight of KOH, relative to the water the flow rate of the solution EB into the reactor is between 100 and 500 kg/h, notably about 300 kg/h the degree of filling with the solution EB of the reactor 5 is from 20% to 50%, notably about 30% the temperature at which the solution EB is injected into the reactor 5 is between 80° C. and 200° C., notably about 130° C.

the temperature of the reactor 5 is between 150° C. and 220° C., notably about 200° C.

the duration of this sequence is between 15 minutes and 8 hours; it is notably 2 hours the residence time of the solution EB in the reactor 5 is between 5 and 15 minutes, and notably about 10 minutes sub-sequence 2 (optional): Cleaning of the cyclone 8 by rinsing with the water ER to complete the cleaning. The term "water flush" can be used, insofar as the rinsing consists, in this implementational example, in spraying water under pressure into the cyclone, which water is subsequently rapidly removed.

The operating conditions of this sequence, if it is performed, are as follows:

number of rinses: from 1 to 10, for example equal to 2 temperature of the rinsing water: 20° C. to 80° C., for example 20° C. (i.e. either ambient temperature or close to ambient temperature, or a higher temperature requiring preheating of the ER rinsing water)

In the cleaning phase=sequence T2, a must is obtained at the outlet of the cyclone 8, which is no longer the conventional acidic must AM but a basic must BM.

The frequency of the cleaning procedure/of sequence 2 can vary widely depending on the type and size of the pretreatment reactor 5, on the type of biomass being processed, and the like. For example, the cleaning can be triggered when the torque of one of the transportation screws internal to the reactor increases by more than 15%, with respect to the torque observed at the start of production. It can also be triggered after a given period, which can range from 2 hours to 4 months of production.

Figure 3:
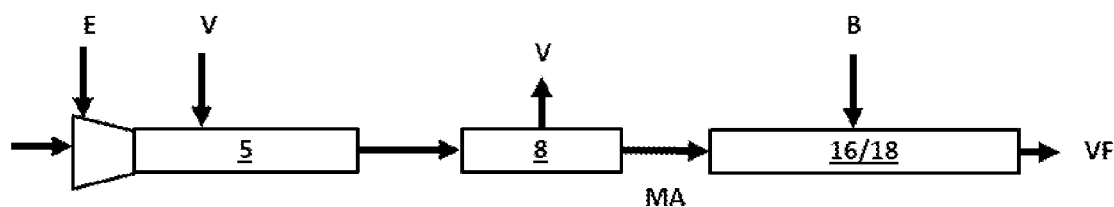
FIG. 3 shows the facility implementing a first variant of the first sequence T1 of the process according to the invention shown in FIG. 1.

FIG. 3 describes a mode of functioning of the process according to the sequence T1, from the pretreatment reactor up to the ethanolic fermentation: after the separation by the cyclone 8 (or any other liquid/gas separation device), the acidic must obtained AM is sent for enzymatic hydrolysis, with adjustment of the pH by supplying base B directly into the hydrolysis reactor, so as to obtain, after fermentation, a fermentation wine FW.

Figure 4:
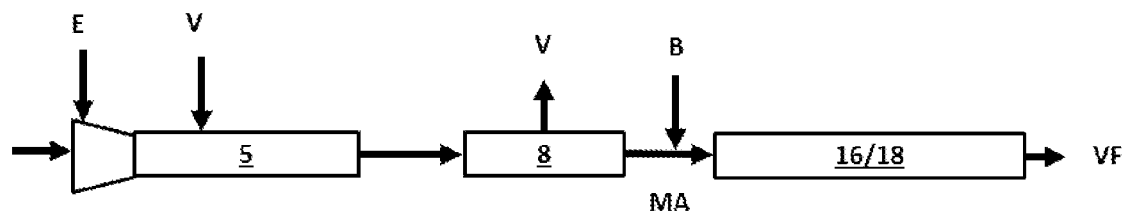
FIG. 4 shows the facility implementing a second variant of the first sequence T1' of the process according to the invention shown in FIG. 1.

FIG. 4 is a variant of the process of FIG. 3: the difference here is that the adjustment of the pH of the acidic must AM is performed before introduction into the hydrolysis reactor, notably by passing into a neutralization zone/vessel with a supply of base, or by introducing a supply of base into the pipe for transfer from the cyclone to the hydrolysis reactor.

Figure 5:
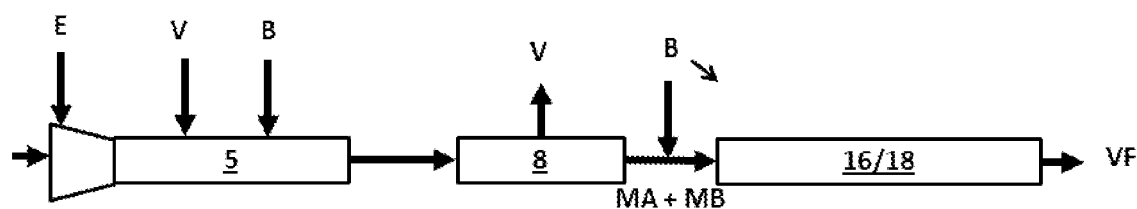
FIG. 5 shows the facility implementing a first variant of the second sequence T2 of the process according to the invention shown in FIG. 1.
Figure 6:
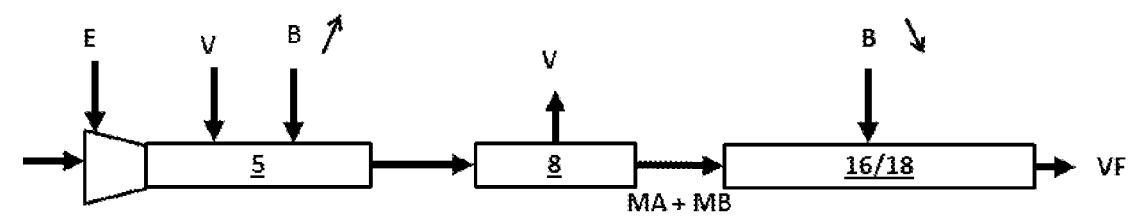
FIG. 6 shows the facility implementing a second variant of the second sequence T2' of the process according to the invention shown in FIG. 1.

FIG. 5 describes a mode of functioning of the process according to the sequence T2, from the pretreatment reactor up to the ethanolic fermentation: after the separation by the cyclone 8 (or any other liquid/gas separation device), the acidic must obtained BM is added to temporarily stored acidic must AM to make a mixture AM+BM which is sent for enzymatic hydrolysis, with adjustment of the pH by supplying base B directly into the hydrolysis reactor, so as to obtain, after fermentation, a fermentation wine FW. Alternatively, as shown in FIG. 6, the supplying of base may be performed upstream of the hydrolysis reactor. In both cases, the supply of base will be less than the supply of base required during the sequence T1, since the must mixture AM+BM is globally less acidic than the acidic must AM, depending on the proportion of basic must in the mixture.

Different variants can be applied to the example of cleaning process/sequence T2 described above, while remaining within the scope of the invention, some of which variants are described in detail below (some at least of these variants can be alternative or cumulative):

A—During cleaning, the concentration of acid A of the impregnation liquor preparation vessel 31 can be reduced to a zero concentration optionally, that is, ultimately, an impregnation which is then performed only with water.

B—The washing water E for the screw 2*b* conveying the impregnated biomass into the reactor 5 can be recycled into the vessel for preparation 51 of the basic solution EB during cleaning, which makes it possible to reduce the additional water consumption due to the cleaning.

C—The biomass can be impregnated with a basic liquor during the cleaning sequence, either with the same basic liquor EB as that prepared in the vessel 6 or a different basic liquor, notably in terms of concentration of base B. This variant makes it possible to reduce the amount of pure basic solution to be introduced into the pretreatment reactor 5, since there will no longer be, or will be less, acid to be neutralized in order to reach the target basic pH. However, a certain amount of basic liquor will be removed in the pressate (which corresponds to the water extracted from the screw 2').

Thus, it may remain necessary to supply basic liquor EB directly into the reactor 5 (via the vessel 51): the vessel 51 for preparation of basic liquor EB still has two inlets, one for the concentrated base B (concentrated KOH), the other for the water, but here it also has two outlets: one outlet to the pretreatment reactor, as previously, and one outlet to the impregnation reactor 3. With this configuration, it is possible to feed the impregnation reactor 3 either with the acidic solution EA from the vessel 31 during the sequence T1, or with the basic solution EB from the vessel 6 during the sequence T2. The vessel 6 can thus simultaneously feed the two reactors 3 and 5, or at least for a common period during the cleaning of the reactor 5. It is also possible to anticipate and begin to feed one of the reactors with basic solution EB before the other, notably the impregnation reactor 3, before the start of cleaning with the EB solution of the pretreatment reactor 5.

D—It is also possible to combine the two preceding variants, with, at the same time, the recycling of the pressate at the outlet of the screw 2*b* into the vessel 61 for preparation of basic liquor EB, and the feeding via this same vessel 51 of the two reactors 3 and 4 during at least a part of the sequence T2.

E—It is also possible to use two impregnation reactors 3,3' operating alternately. As in the variant C, the biomass is impregnated not with an acidic liquor EA but with a basic liquor EB during at least a part of the cleaning/sequence T2 of the reactor, or even also a little before, in the following manner: in production mode, the biomass is brought into the pretreatment reactor 3 fed with acidic liquor via the vessel 2, and in production+cleaning mode (during all or part of the cleaning), the biomass is rerouted to the impregnator 3', which itself is fed with basic liquor EB from the vessel 51. A second dedicated impregnation reactor 3' is thus used for the cleaning. This embodiment has the advantage, in comparison with the variant C, of reducing the transition times between acidic impregnations and basic impregnations.

F—The variants E and B can be combined, that is to say the two impregnation reactors 3,3' can be used and the water extracted from the screw 2' can be recycled into the vessel 6 for preparation of basic liquor EB.

G—The must (also called the must) can be recycled, notably in the context of the variant E with two impregnation reactors: the basic pretreated biomass M1 which exits from the separation device 8 during the cleaning of the pretreatment reactor 5. This is because, during this period, it is basic. It is then possible to wash this must BM at the outlet of the separation device 8 with water: it becomes a washed basic must BM', and to extract therefrom a basic aqueous phase E1 which is recycled into the vessel 51 for preparation of the basic liquor.

H—Another variant consists in using two separation devices 5,5' (cyclone) operating alternately: a cyclone is added which is dedicated to the treatment of the basic must BM. In production mode/sequence T1, the first cyclone is operational, it treats an acidic must AM; in production+ cleaning mode/sequence T2, the output of the reactor 5 is switched to the second cyclone 5', which will thus separate only basic must BM. The advantage of this variant is that it reduces the transition time between the two modes. It is also possible to combine this variant with the variant G: the basic must BM, once separated in one of the cyclones, is also washed in order to recycle the basic washing water E1 into the vessel for preparation 51 of basic liquor.

J—This variant emerges from the preceding variant E with two impregnation reactors 3,3', with the following difference: In production mode, use is made of the conventional impregnation reactor 3 fed with acidic solution EA via the vessel 1. In production+cleaning mode, the system is switched here to the second impregnation reactor 3' which is fed only with water: during the cleaning/sequence T2, the biomass is thus impregnated only with an aqueous solution at neutral pH (and not a basic solution EB).

K—The invention also applies to processes for the pretreatment of biomass without prior preimpregnation with a liquor (this is then referred to as self-hydrolysis): in this case, the biomass P, after having optionally undergone a treatment of mechanical (grinding, etc.), thermal (drying) or humidification type, is introduced directly into the pretreatment reactor 5.

L—This variant combines the recycling of the pressate E1 of the variant E with that of the washing water for the screw 2b of the variant B to the vessel 6 for preparation of the basic liquor EB. Both the consumption of water and of base required for the cleaning according to the invention are thus more substantially reduced.

M—This variant recommends a thermal integration of the process, by condensation of the steam V at the outlet of the cyclone 8. This steam V is used to heat the basic liquor EB circulating in pipes between the vessel 51 and the pretreatment reactor 5 via a heat exchanger (not shown). It also serves to reduce the amount of water used in the vessel 6 by recovering the condensate obtained from the cooling of the steam exiting from the cyclone, via a condenser (not shown).

N—According to another variant, it can be chosen to inject biomass impregnated with acidic liquor EA into the pretreatment reactor 5 from the impregnation reactor 3 in production mode, and to directly inject non-impregnated biomass P into the pretreatment reactor 5 in sequence T2 (production+cleaning mode), then stopping the feeding of biomass impregnated with acidic liquor.

O—According to yet another variant, which can be combined with all the others, it can be chosen to inject, into the pretreatment reactor, a given impregnated biomass in production mode (sequence T1), and to inject another biomass, impregnated or not with a liquor, in production+cleaning mode (sequence T2). For example, in production mode, a straw-type biomass is chosen and, in production+cleaning mode, a more abrasive poplar-based biomass is chosen: a temporary increase is thus brought about in the cleaning time, the abrasive nature of the biomass, in order to assist in more easily detaching the solid coke residues from the walls.

EXAMPLES

Example 1 not in accordance with the invention: use of a basic must BM alone in SSCF ("Simultaneous saccharification and co-fermentation", i.e. concomitant enzymatic hydrolysis and alcoholic fermentation)

A batch of wheat straw is pretreated by steam explosion under acidic conditions. To do this, the straw is ground to 50 mm and then introduced into a first impregnation reactor 3. The characteristics and composition of the wheat straw are as follows:

Solids content: 91.07%

Biomass flow rate: 65 kg SC/h

The straw is introduced into a first impregnation reactor 3 so as to be placed in contact with an acidic liquor before being sent into a steam-explosion pretreatment reactor 5. The operating conditions during production (sequence T1) are as follows:

Impregnation:

Flow rate of concentrated acid solution: 1.29 kg/h, i.e. a pH of about 1

Acidity of the acidic liquor: 1.1 g $H_2SO_4$/100 g

Impregnation time: 1 min

Steam explosion (cooking reactor 5):

Residence time: 5 min

Production time: 20 hours

After a period of 20 hours of functioning under these conditions, a sequence T2 of cleaning of the steam-explosion pretreatment reactor 5 is commenced:

Impregnation:

Flow rate of concentrated acid solution: 1.29 kg/h, i.e. a pH of about 1

Acidity of the acidic liquor: 1.1 g $H_2SO_4$/100 g

Impregnation time: 1 min

Steam explosion sequence T2/cleaning:

Residence time: 10 min

Flow rate of basic liquor: sufficient to lower the SC to the value for saturation of the pressate recycling biomass (mixture of water for washing the feed means of the cooking reactor 5 ("plug screw" 2b) and of spent acidic liquor): 100%

Duration of the cleaning/sequence T2: 2 h

Concentration of the KOH in the basic liquor: sufficient to change the biomass from a pH of 3 to a pH of 13

After the cleaning sequence T2, a cycle of 20 hours of production T1 and 2 hours of cleaning T2 was performed. The total number of cycles performed is three production/cleaning cycles (sequence T1/sequence T2).

In total, 54 kg SC/hour (operating time=66 hours; m (straw)=3540 kg) of wheat straw were consumed to produce:

50 kg SC/hour of substrate pretreated under acidic conditions (operating time=60 hours, m (acidic substrate)=3029 kg)

78 kg SC/hour of substrate pretreated under acidic conditions (operating time=4.5 hours, m (basic substrate)=353 kg)

70 kg SC/hour of "transition" musts treated under variable pH conditions during the cooking (operating time=1.5 hours; m (transition substrate)=106 kg)

The musts treated under AM acidic conditions and under BM alkaline conditions are sampled. SSCF tests are performed in the laboratory with:

An SSCF test fed only with AM must produced under acidic conditions, with a final SC (solids content) of 24% of must An SSCF test fed only with BM must produced under alkaline conditions, with a final SC of 19% of must.

The SSCF conditions are conventional, and will not be presented in further detail. They involve neutralization to reach the desired pH in order to maximize the activity of the enzymes. The test is performed in fed-batch mode: a first portion of the must is placed in contact with the biocatalysts, and the rest of the must is then added portionwise over a period of 6 hours so as to control the viscosity of the medium in the first hours.

Figure 7:
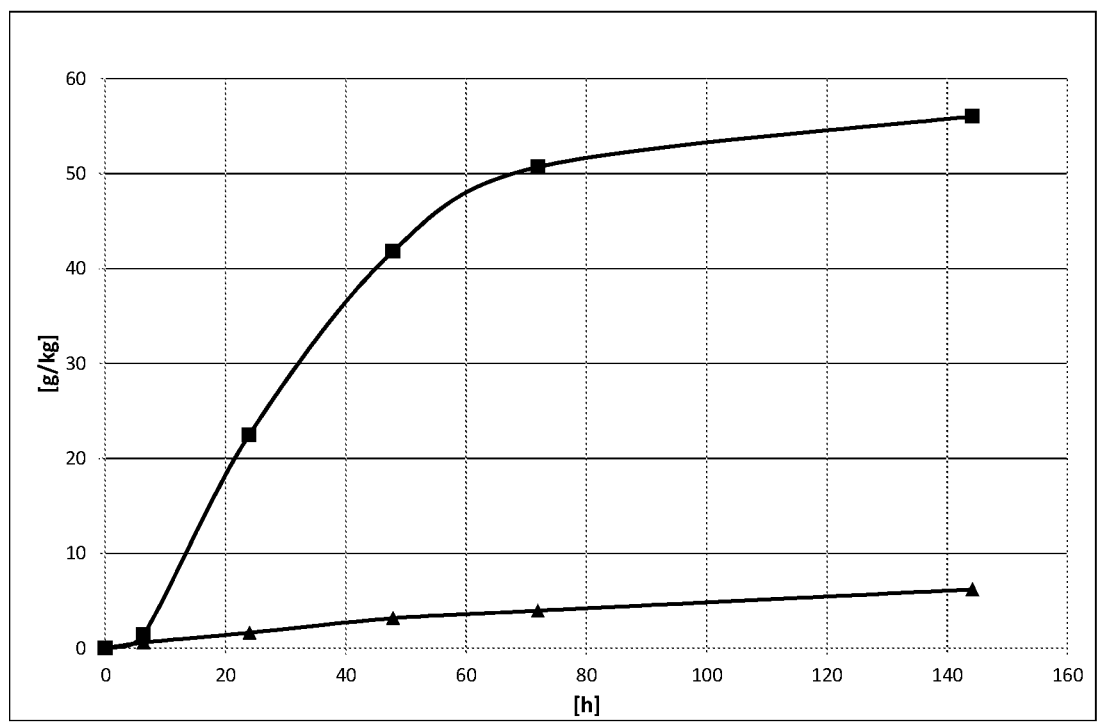
FIG. 7 is a graph of monitoring of ethanol production according to an example not in accordance with the invention.

FIG. 7 is a graph with, on the x-axis, the duration of the SSCF step in hours and, on the y-axis, the amount of ethanol produced in g/kg. The production of ethanol obtained from the acidic must AM corresponds to the curve with diamond-shaped points, and the production of ethanol obtained from the alkaline must BM corresponds to the curve with square points. By expressing these results as ethanol concentration, the following are obtained:

final titer of the acidic must AM: 56 g/kg of ethanol,
final titer of the alkaline must BM: 6 g/kg of ethanol.

By expressing these results as conversion yield, the following are obtained:

on the acidic must, AM, the yield is 30.4% by weight of ethanol/sugars present at the inlet
on the alkaline must BM, this yield is 7.5%.

It is clearly seen, on reading this graph and these data, that the alkaline must BM used alone does not make it possible to obtain a satisfactory production of ethanol.

Example 2: In Accordance with the Invention

The acidic musts AM and alkaline musts BM produced in example 1 are used as a mixture in the SSCF test in the same protocol as for example 1. The test is fed with an AM+BM mixture of acidic and alkaline musts produced in a mass proportion of 80% of acidic must AM and 20% of alkaline must BM (crude weight). This mixture is prepared before introducing into the SSCF reactor 16/18. The final SC introduced is 24% SC coming from the must mixture. The feeding with must(s) is partly done in an initial batch phase, and partly in fed-batch mode for the first six hours of reaction.

Figure 8:
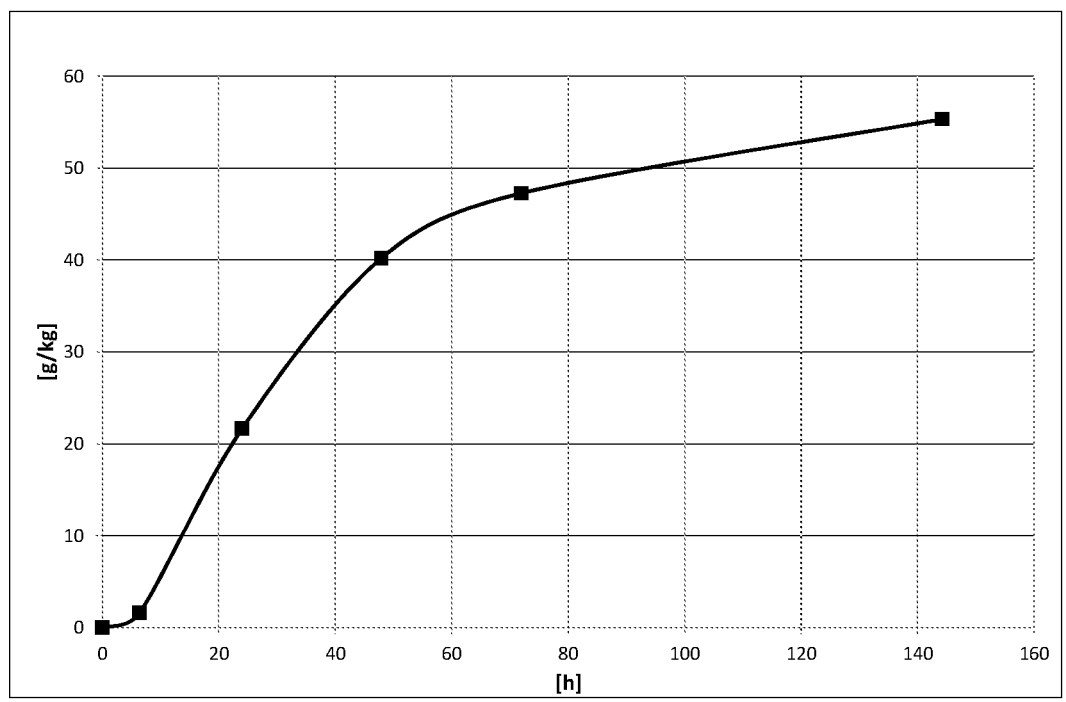
FIG. 8 is a graph of monitoring of ethanol production according to an example in accordance with the invention.

The ethanol production kinetics are shown in the graph of FIG. 8, which shows the same data on the x-axis and the y-axis as in the graph of FIG. 7, the curve corresponding this time to the production of ethanol using the AM+BM must mixture.

The following are obtained:
a final titer of 55.3 g/kg of ethanol, which is similar to the results obtained with the acidic must AM alone (it is considered that a difference of less than 1 g/kg of ethanol is not significant since it is within the precision of the test);
a yield of 32.7% by weight of ethanol/sugars present at the inlet.

It should be noted that it was necessary to readjust the pH of this mixture with sulfuric acid during the initial batch phase and the fed-batch phase.

This example thus demonstrates that with a significant proportion (20%) of alkaline must in the must mixture, it is possible to continue to obtain an ethanol production substantially identical to that obtained with a 100% acidic must: it is thus possible to perform continuous cleaning of the impregnation reactor without having an impact on the ethanol yield for all the production of the facility, by using all the must obtained after pretreatment, whether it is acidic or alkaline, by means of prior mixing of the two types of musts.

Example 3 in accordance with the invention: use of an acidic must AM, of an alkaline must BM and of a washed must M1 obtained from an SRC (Short Rotation Coppice) poplar wood substrate A batch of SRC poplar wood is pretreated by steam explosion under acidic conditions. To do this, the SRC poplar wood is ground to 50 mm and then introduced into a first impregnation reactor 3.

The characteristics and composition of the wood are as follows:
Solids content SC: 55.50% by weight
Operating flow rate: 64 kg SC/h The wood is introduced into a first impregnation reactor 3 so as to be placed in contact with an acidic liquor before being sent into a steam-explosion pretreatment reactor 5. The operating conditions during production are as follows:

Impregnation for the production and cleaning (sequences T1 and T2):
Flow rate of concentrated acid solution: 2.6 kg/h
Conductivity of the acidic liquor at 80° C.: 103 mS/cm
Impregnation time: 1 min
Steam explosion (sequence T1/production):
Residence time: 7.5 min
Steam feed: 100% at the top
Pressate recycling: 100%
Production time: 58.5 hours After a period of 60 hours of functioning under these conditions, a sequence of cleaning/sequence T2 of the steam explosion reactor 5 is commenced:

Impregnation for the production and cleaning/sequence T2:
Flow rate of concentrated acid solution: 2.6 kg/h
Conductivity of the acidic liquor at 80° C.: 103 mS/cm
Steam explosion cleaning/sequence T2:
Residence time: 10 min
Basic liquor flow rate: sufficient to lower the SC down to the biomass saturation value
Pressate recycling: 100%
Duration of the cleaning: 1.5 h
Concentration of the KOH in the liquor: sufficient to change the biomass from a pH of 3 to a pH of 13
Number of cycles: Three production and cleaning cycles (3×sequence T1+sequence T2)

In total, 116 kg SC/hour (operating time=60 hours; m (straw)=6960 kg) of SRC poplar were consumed to produce:

119 kg/hour of substrate pretreated under acidic conditions (operating time=58.5 hours, m (acidic substrate)=6962 kg)

361 kg/hour of substrate pretreated under alkaline conditions (operating time=1 hour, m (basic substrate)=361 kg)

178 kg/hour of transition musts treated under variable pH conditions during the cooking (operating time=30 min; m (transition substrate)=89 kg)

A portion of the must treated under acidic conditions is filtered on a belt filter, with counter-current washing, to separate a sugary liquor (serving for the yeast propagation) from a partially washed must known as M1 which will be reintroduced in the liquefaction.

SSCF tests are performed on the musts pretreated under acidic conditions, under alkaline conditions, and on the partially washed musts (the transition musts were not differentiated here):

An SSCF test with AM must produced under acidic conditions, with must produced under alkaline conditions BM, with partially washed pretreated must M1, 20 mg of enzymes/g SC, for a final SC of 22.2% by weight. This test required 23.7 kg of neutralization solution (containing 2.5% by weight of $NH_3$).

The SSCF protocol commences with a "liquefaction" step performed in fed-batch mode.

The initial reaction mixture is composed of water, basic must, partially washed must and a portion of the must produced under acidic conditions (up to 12.5% SC in the feedstock) and supplemented with nutrients for the yeasts. The pH is adjusted to 5.3 with an alkaline solution (containing 23.5% by weight of NH3). When the pH is at 5.3, the enzyme biocatalysts and yeasts are added. This addition corresponds to the starting of the enzymatic hydrolysis reaction, and of the concomitant fermentation reaction. After a short time, addition in fed-batch mode of the rest of the must produced under acidic conditions is performed over a period of 2 hours.

When the rheology of the mixture permits it, the mixture is transferred into an SSCF vessel where the hydrolysis and fermentation reactions are continued. The total duration of the SSCF is 144 hours (total in the two reactors).

Figure 9:
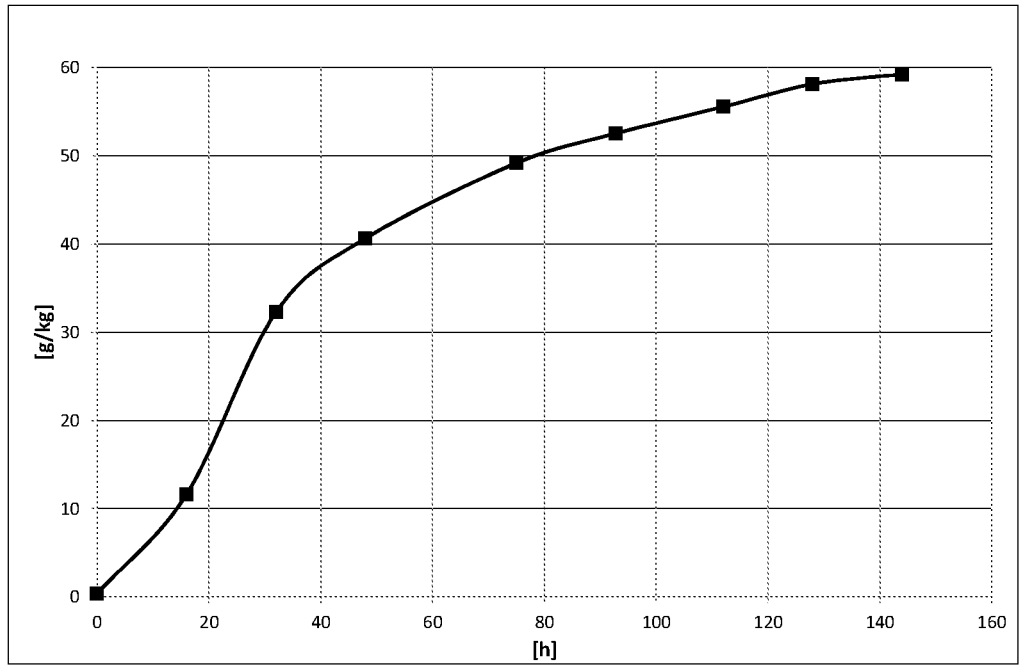
FIG. 9 is a graph of monitoring of ethanol production according to an example in accordance with the invention.

The graph of FIG. 9, with the same conventions as the graphs of the preceding figures, corresponds to the production of ethanol produced from this must. This implementation affords:

For the SSCF, a final titer of 59.2 g/kg of ethanol
For the SSCF, a yield of 41.3% by weight of ethanol/sugars present at the inlet Example 4 in accordance with the invention: acidic must AM and alkaline must BM obtained from a straw substrate A batch of wheat straw is pretreated by steam explosion under acidic conditions. To do this, the straw is ground to 50 mm, freed of dust and then introduced into a first impregnation reactor.

The characteristics and composition of the wheat straw are as follows:
Solids content: 88.30% by weight
Operating flow rate: 65 kg SC/h The straw is introduced into a first impregnation reactor 3 so as to be placed in contact with an acidic liquor before being sent into a steam-explosion pretreatment reactor 5. The operating conditions during production are as follows:

Impregnation for the production and cleaning (sequences T1 and T2):
Flow rate of concentrated acid solution: 2.5 kg/h
Conductivity of the acidic liquor at 80° C.: 103 mS/cm
Impregnation time: 1 min
Steam explosion production (sequence T1)
Residence time: 5 min
Steam feed: 100% at the top
Pressate recycling: 100%
Production time: 78 hours After a period of 80 hours of functioning under these conditions, a sequence of cleaning/sequence T2 of the steam explosion reactor 5 is commenced:

Impregnation for the production and cleaning (sequence T2):
Acidic solution flow rate: 2.5 kg/h
Conductivity of the acidic liquor at 80° C.: 103 mS/cm
Steam explosion cleaning/sequence T2:
Residence time: 10 min
Basic liquor flow rate: sufficient to lower the SC down to the biomass saturation value
Pressate recycling: 100%
Duration of the cleaning: 2 h
Concentration of the KOH in the liquor: sufficient to change the biomass from a pH of 3 to a pH of 13
Number of cycles: Four production and cleaning cycles: 4 cycles T1+T2

In total, during the four production/cleaning cycles, 73 kg/hour (operating time=320 hours; m (straw)=23 360 kg) of wheat straw were consumed to produce:

138 kg/hour of substrate pretreated under acidic conditions (operating time=312 hours, m (acidic substrate)=43 056 kg)

342 kg/hour of substrate pretreated under alkaline conditions (operating time=8 hours, m (basic substrate)=2732 kg)

SSCF tests are performed on the AM musts pretreated under acidic conditions and under alkaline conditions BM, without differentiating the transition musts:

An SSCF test was performed with AM must produced under acidic conditions, with BM must produced under alkaline conditions, for a final SC of 22.5% by weight. This test required 42.7 kg of neutralization solution (containing 23.5% by weight of NH3).

The SSCF protocol commences with a "liquefaction" step to arrive at a mixture of 92% by weight of must produced under acidic conditions/8% by weight of must produced under basic conditions. The liquefaction is performed in fed-batch mode. The initial reaction mixture is composed of water, basic must, and a portion of the must produced under acidic conditions (up to 12.5% SC in the feedstock) and supplemented with nutrients for the yeasts. The pH is adjusted to 5.3 with an alkaline solution (containing 23.5% by weight of $NH_3$). When the pH is at 5.3, the enzyme biocatalysts and yeasts are added. This addition corresponds to the starting of the enzymatic hydrolysis reaction, and of the concomitant fermentation reaction. After a short time, addition in fed-batch mode of the rest of the must produced under acidic conditions is performed over a period of 6 hours.

When the rheology of the mixture permits it, the mixture is transferred into an SSCF vessel where the hydrolysis and fermentation reactions are continued. The total duration of the SSCF is 144 hours (total in the two reactors).

Figure 10:
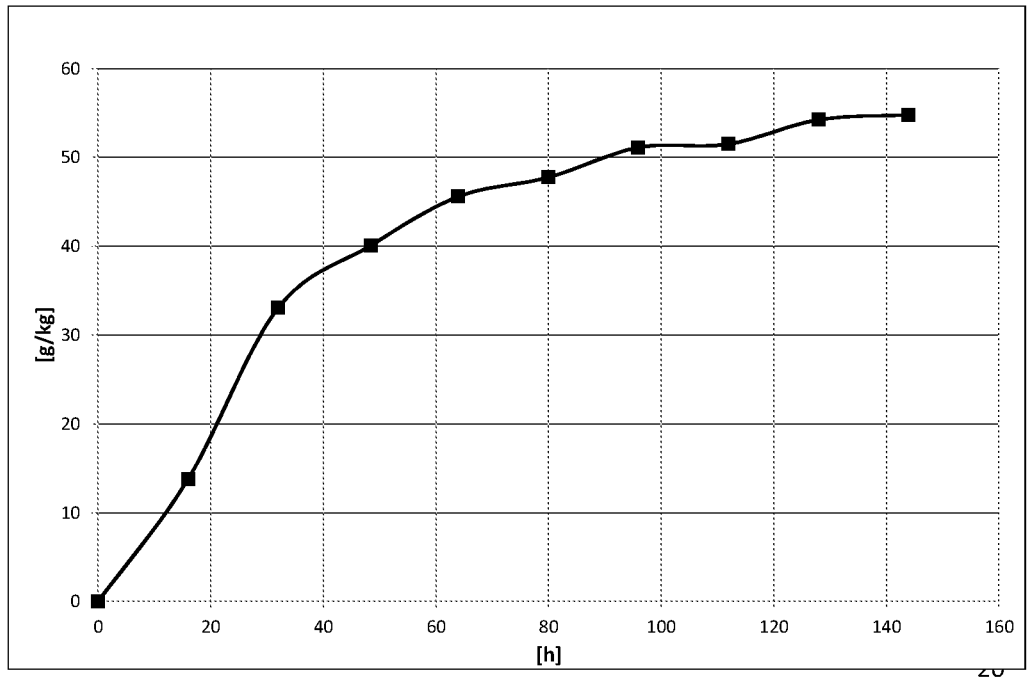
FIG. 10 is a graph of monitoring of ethanol production according to an example in accordance with the invention.

The ethanol production kinetics are described in the graph of FIG. 10, with the same conventions as for the preceding graphs.

This implementation in accordance with the invention makes it possible to obtain:
a final titer of 54.8 g/kg of ethanol
a yield of 36.2% by weight of ethanol/sugars present at the inlet.

With an addition of 8% by crude weight of BM must into the AM acidic must, the SSCF double reaction thus takes place satisfactorily.

Example 5 in accordance with the invention: acidic must AM, alkaline must BM and washed must M1, obtained from a straw substrate (pretreatment and washing conditions different from those of example 4, with a reduction in the reactor temperature)

A batch of wheat straw is pretreated by steam explosion under acidic conditions. To do this, the straw is ground to 50 mm, freed of dust and then introduced into a first impregnation reactor 3.

The characteristics and composition of the wheat straw are as follows:
Solids content: 88.30% by weight
Operating flow rate: 50 kg SC/h The straw is introduced into a first impregnation reactor 3 so as to be placed in contact with an acidic liquor before being sent into a steam-explosion pretreatment reactor 5. The operating conditions during production are as follows:

Impregnation for the production and cleaning (sequence T1):
Flow rate of concentrated acid solution: 2.5 kg/h
Conductivity of the acidic liquor at 80° C.: 103 mS/cm
Impregnation time: 1 min Steam explosion in production/sequence T1:
Residence time: 5 min
Steam feed: 100% at the top
Pressate recycling: 100%
Production time: 78 hours After a period of 80 hours of functioning under these conditions, a sequence of cleaning/sequence T2 of the steam explosion reactor 5 is commenced:

Impregnation for the production and cleaning/sequence T2:
Acidic solution flow rate: 2.5 kg/h
Conductivity of the acidic liquor at 80° C.: 103 mS/cm
Steam explosion cleaning/sequence T2:
Residence time: 10 min
Basic liquor flow rate: sufficient to lower the SC down to the biomass saturation value
Pressate recycling: 100%
Duration of the cleaning: 2 h
Concentration of the KOH in the liquor: sufficient to change the biomass from a pH of 3 to a pH of 13
Number of cycles: one production and cleaning cycle (T1+T2)

In total, during this production/cleaning cycle, 58 kg/hour (operating time=80 hours; m (straw)=4640 kg) of wheat straw were consumed to produce:

109 kg/hour of substrate pretreated under acidic conditions (operating time=78 hours, m (acidic substrate)=8502 kg)

372 kg/hour of substrate pretreated under alkaline conditions (operating time=2 hours, m (basic substrate)=744 kg)

An SSCF test was performed in the pilot plant on the musts pretreated under acidic conditions AM and under alkaline conditions BM, for a final SC of 22.5% by weight. This test required 33.8 kg of neutralization solution (containing 23.5% by weight of $NH_3$).

The SSCF protocol commences with a "liquefaction" step to arrive at a mixture of 90% by weight of must produced under acidic conditions AM/10% by weight of must produced under basic conditions BM.

The liquefaction is performed in fed-batch mode. The initial reaction mixture is composed of water, basic must, and a portion of the must produced under acidic conditions (up to 12.5% SC in the feedstock) and supplemented with nutrients for the yeasts. The pH is adjusted to 5.3 with an alkaline solution (containing 23.5% by weight of $NH_3$). When the pH is at 5.3, the enzyme biocatalysts and yeasts are added. This addition corresponds to the starting of the enzymatic hydrolysis reaction, and of the concomitant fermentation reaction. After a short time, addition in fed-batch mode of the rest of the must produced under acidic conditions is performed over a period of 6 hours.

When the rheology of the mixture permits it, the mixture is transferred into an SSCF vessel where the hydrolysis and fermentation reactions are continued. The total duration of the SSCF is 118 hours (total in the two reactors).

Figure 11:
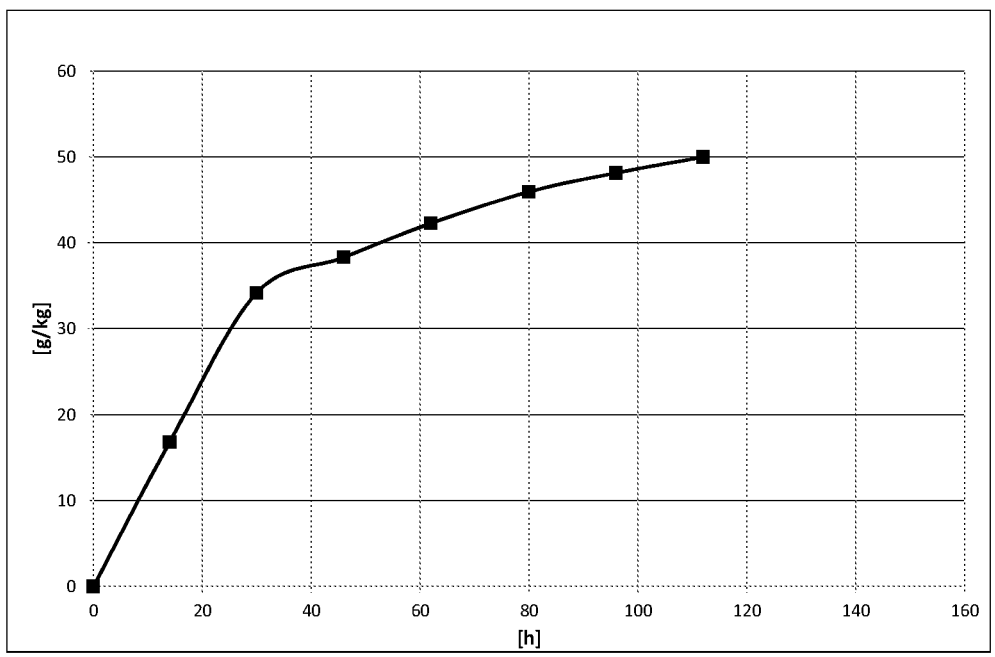
FIG. 11 is a graph of monitoring of ethanol production according to an example in accordance with the invention.

The ethanol production kinetics are described in the graph of FIG. 11, which repeats the same conventions as for the preceding graphs.

This implementation in accordance with the invention makes it possible to obtain, at 118 hours:
a final titer of 50.0 g/kg of ethanol
a yield of 32.2% by weight of ethanol/sugars present at the inlet.

The ethanol production remains, here also, at a satisfactory level even with addition of a significant amount (10%) of basic must to the conventional acidic must AM.

The invention claimed is:

1. A process for treating lignocellulosic biomass, successively comprising:
   a) providing a first biomass pretreated under acidic or neutral pH conditions, and providing a second biomass pretreated under acidic, neutral, or basic conditions,
   b) pretreating the first biomass in a pretreatment reactor to produce an acidic or neutral pretreated must (AM), alternating with
   b') pretreating the second biomass in the pretreatment reactor to produce a basic pretreated must (BM), wherein basic aqueous solution (EB) is optionally introduced into the pretreatment reactor, and
   c) enzymatic hydrolysis in a hydrolysis reactor of a mixture of the acidic or neutral pretreated must (AM) obtained from b) with the basic pretreated must (BM) obtained from b').

2. The process as claimed in claim 1, wherein, during c) said mixture is replaced with only acidic or neutral pretreated must (AM) for a portion of the duration of c).

3. The process as claimed in claim 1, wherein mixing of the acidic or neutral pretreated must (AM) obtained from step b) with the basic pretreated must (BM) obtained from step b') in step c) is performed upstream of the hydrolysis reactor.

4. The process as claimed in claim 1, wherein mixing, in c), of the acidic or neutral pretreated must (AM) obtained from b) with the basic pretreated must (BM) obtained from b') is performed by withdrawals from a zone for temporary storage of the basic pretreated must (BM) at an outlet of the pretreatment reactor.

5. The process as claimed in claim 1, wherein in b') producing a basic pretreated must (BM) is a step of cleaning the pretreatment reactor.

6. The process as claimed in claim 1, further comprising adjusting the pH of the pretreated musts AM and BM, or adjusting the pH of the mixture of pretreated musts before or during the enzymatic hydrolysis c).

7. The process as claimed in claim 1, wherein, over a given production time, the sum of the durations of b) pretreatment of the first biomass is greater than the sum of the durations of b') of pretreatment of the second biomass.

8. The process as claimed in claim 1, further comprising performing separation between each of the pretreated musts AM and BM and an aqueous phase, in liquid or vapor form, at an outlet of the pretreatment reactor, by a separation device or several separation devices in parallel.

9. The process as claimed in claim 1, wherein, during the enzymatic hydrolysis c) in the hydrolysis reactor, the mixing of the acidic or neutral pretreated must (AM) obtained from b) with the basic pretreated must (BM) obtained from b') is performed in an AM/BM weight ratio of at least 80/20.

10. The process as claimed in claim 1, wherein pretreatment b) is preceded by impregnating the first biomass with an acidic or neutral aqueous solution in an impregnation reactor.

11. The process as claimed in claim 1, wherein said first and second biomasses are selected from wood, straw, agricultural residues, and *miscanthus*, and said process produces sugars, biofuels, or biobased molecules.

12. The process as claimed in claim 1, further comprising adjusting the pH of the pretreated musts AM and BM or the mixture of pretreated musts, before or during the enzymatic hydrolysis c), to a pH to between 4 and 6.

13. The process claimed in claim 1, wherein, over a given production time, the sum of the durations of b) pretreatment of the first biomass is at least 2 to 5 times greater than the sum of the durations of the b') pretreatment of the second biomass.

14. The process as claimed in claim 1, further comprising performing separation between the acidic or neutral pretreated must (AM) and an aqueous phase, in liquid or vapor form, at an outlet of the pretreatment reactor by a first separation device, and performing separation between the basic pretreated must (BM) and an aqueous phase, in liquid or vapor form, at the outlet of the pretreatment reactor by a second separation device, wherein the first and second separation devices operate alternately.

15. The process as claimed in claim 1, wherein mixing of the acidic or neutral pretreated must (AM) obtained from step b) with the basic pretreated must (BM) obtained from step b') in step c) is performed directly in the hydrolysis reactor.

16. A process for treating lignocellulosic biomass, successively comprising:
- a) pretreating a first acidic or neutral pH biomass in a pretreatment reactor to produce an acidic or neutral pretreated must (AM),
- alternating with
- a') pretreating a second biomass in the pretreatment reactor to produce a basic pretreated must (BM), wherein
  - (i) the second biomass is an acidic or neutral biomass, and sufficient aqueous solution (EB) is introduced into the pretreatment reactor to produce the basic pretreated must (BM), or
  - (ii) the second biomass is a basic biomass, and basic aqueous solution (EB) is optionally introduced into the pretreatment reactor, and
- b) enzymatic hydrolysis in a hydrolysis reactor of a mixture of the acidic or neutral pretreated must (AM) obtained from b) a) with the basic pretreated must (BM) obtained from a').

* * * * *